US006795807B1

(12) United States Patent
Baraff

(10) Patent No.: US 6,795,807 B1
(45) Date of Patent: Sep. 21, 2004

(54) METHOD AND MEANS FOR CREATING PROSODY IN SPEECH REGENERATION FOR LARYNGECTOMEES

(76) Inventor: David R. Baraff, 630 Llewelyn Rd., Berwyn, PA (US) 19312

( * ) Notice: Subject to any disclaimer, the term of this patent is extended or adjusted under 35 U.S.C. 154(b) by 189 days.

(21) Appl. No.: 09/641,157

(22) Filed: Aug. 17, 2000

Related U.S. Application Data

(60) Provisional application No. 60/149,106, filed on Aug. 17, 1999.

(51) Int. Cl.[7] .......................... G10L 21/06; G10L 17/04; G10L 13/06

(52) U.S. Cl. ........................ 704/271; 704/248; 704/269

(58) Field of Search ................................ 704/205–210, 704/258–269, 270–271, 248, 234, 214

(56) References Cited

U.S. PATENT DOCUMENTS 3,704,345 A * 11/1972 Coker et al. ................ 704/260
3,894,195 A * 7/1975 Kryter ........................ 381/23.1
4,696,040 A * 9/1987 Doddington et al. ....... 704/234
4,720,862 A * 1/1988 Nakata et al. .............. 704/214
5,305,420 A * 4/1994 Nakamura et al. .......... 704/208
5,326,349 A 7/1994 Baraff
5,592,585 A * 1/1997 Van Coile et al. .......... 704/206
5,636,325 A * 6/1997 Farrett ........................ 704/258
5,727,120 A * 3/1998 Van Coile et al. .......... 704/206
5,729,694 A * 3/1998 Holzrichter et al. ...... 704/270.1
5,748,838 A * 5/1998 Stevens ...................... 704/261
5,774,854 A 6/1998 Sharman
5,812,681 A 9/1998 Griffin
5,860,064 A 1/1999 Henton
5,907,826 A 5/1999 Takagi
5,920,840 A 7/1999 Satyamurti et al.
6,006,175 A * 12/1999 Holzrichter ................. 704/206
6,023,671 A * 2/2000 Iijima et al. ................ 704/214
6,052,664 A * 4/2000 Van Coile et al. .......... 704/260

OTHER PUBLICATIONS

Pang et al ("Prosody Model In A Mandarin Text–To–Speech System Based On A Hierarchical Approach", International Conference on Multimedia, Jul. 2000).*

Lee et al ("TTS based very low bit rate speech coder", International Conference on Acoustics, Speech, and Signal Processing Mar. 1999).*

* cited by examiner

*Primary Examiner*—Richemond Dorvil
*Assistant Examiner*—Daniel A Nolan
(74) *Attorney, Agent, or Firm*—Robert B. Famiglio; Famiglio & Associates

(57) ABSTRACT

A device and a method to be used by laryngeally impaired people to improve the naturalness of their speech. An artificial sound creating mechanism which forms a simulated glottal pulse in the vocal tract is utilized. An artificial glottal pulse is compared with the natural spectrum and an inverse filter is generated to provide an output signal which would better reproduce natural sound. A digital signal processor introduces a variation of pitch based on an algorithm developed for this purpose; i.e. creating prosody. The algorithm uses primarily the relative amplitude of the speech signal and the rise and fall rates of the amplitude as a basis for setting the frequency of the speech. The invention also clarifies speech of laryngectomees by sensing the presence of consonants in the speech and appropriately amplifying them with respect to the vowel sounds.

2 Claims, 4 Drawing Sheets

METHOD AND MEANS FOR CREATING PROSODY IN SPEECH REGENERATION FOR LARYNGECTOMEES

REFERENCE TO PRIOR APPLICATION

This application claims the benefit of the filing date of the applicant's Provisional Patent Application No. 60/149,106 filed Aug. 17, 1999.

REFERENCE TO COMPUTER PROGRAM LISTING ON COMPACT DISC

Included with this application is a compact disc named 09641157 which contains five separate files, together which comprise table 1 referenced in this specification. The file names, date of creation on compact disc and file sizes are as follows: Main program file appl 09641,157 Baraff.txt, created Nov. 15, 2002 of size 29.8 KB; Pitch program file appl 09641,157 Baraff.txt, created Nov. 15, 2002 of size 4.11 KB; Synth program file appl 09641,157 Baraff.txt, created Nov. 15, 2002 of size 5.47 KB; LPC program file appl 09641,157 Baraff.txt, created Nov. 15, 2002 of size 1.87 KB; and Vowel program file appl 09641,157 Baraff.txt created Nov. 15, 2002 of size 1.48 KB.

AUTHORIZATION UNDER 37 C.F.R. §1.71(d)

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND OF THE INVENTION

1. Field of the Invention

This invention relates in general to the field of artificial speech for laryngectomees, (a laryngeally impaired individual). It relates as well to the field of voice analysis and synthesis such as has been used in the field of communications. It also relates to the field of voice instruction and training. It also relates to the field of computer controlled prosthetics, particularly as such involves correction of human speech from a voice impaired individual to enable such individual to create natural sounding speech by creating or reproducing prosody and other natural inflections in a human-voice.

2. Description of Prior Art

There have been attempts in the past to create means to improve impaired speech, particularly from laryngeally impaired individuals. No speech devices to date have been able to capture, in sufficient detail, information about the specific speaker to recreate his/her own voice. Artificial devices to create a simulated glottal pulse with a manual ability to change frequency have been known for many years. One of the more recent devices has utilized a small loudspeaker mounted in the mouth on the laryngectomee typically on a denture. This was described in U.S. Pat. No. 5,326,349 by Baraff. Some devices which vibrate the neck have been fitted with a control to enable the user to change the pitch of the speech manually as described in U.S. Pat. No. 5,812,681 by Griffin. All of these devices have the drawback of sounding very mechanical. Even when a user has manually changed the pitch, the sound has not been close to the natural sound of the human being. In devices without myoelectric control it is still necessary for the user to time the onset and fall of the glottal pulse sound manually. This timing takes practice and corrective feedback is useful in minimizing the training time.

There are a number of reasons that laryngectomees have not been able to use previous devices to their fullest potential. Firstly, even with devices which have built in pitch control, it is extremely difficult to coordinate the fingers to imitate natural speech prosody. The speaker requires a "good ear" for speech sound coupled with a very strong desire to spend hours of practicing to gain coordination. Many laryngectomees do not possess either the desire or the skill. Secondly, some of the subtleties of creating true prosody may occur in time scales faster than could be manually controlled.

A number of schemes have been developed to create speech from text. One such process is described in the patent by Sharman, U.S. Pat. No. 5,774,854. Conventional speech systems operate in a sequential manner, hence, they do not create prosody until an entire sentence is divided into elements of speech such as words and phonemes. Most of these schemes rely on pre-programmed templates to create prosody. These schemes using a programmed template would not be useful in a real time creation of speech for the laryngectomee because they require the understanding of the word and context to be applied. Although Sharman refers to "real-time" operation, because the text is already present in sentence form, it is not in "real-time" with regard to a speech input such as in the present invention. Real-time speech to speech requires that the analysis be completed within 50 milliseconds or less, that is, well before the entire word has even been spoken. Clearly techniques which are based on understanding the word before applying prosody will not be useful to solve this problem.

A further element of the disclosed invention, the ability to simulate emotions in speech, is perhaps suggested in U.S. Pat. No. 5,860,064, which creates emotion in speech output only in a text to speech system. This system again does not operate in real time with regard to a speech to speech function.

Another feature of the present invention is its use for training of speech, insofar as it includes pattern recognition, of real time speech input. A system for recognizing and coding speech is described in the U.S. Pat. No. 5,729,694 by Holzrichter et al. This speech system relies on pre-coding parts of speech including the feature vectors as generated both by classical LPC coefficients and the inclusion of a physical mapping of the vocal tract elements by using electromagnetic radiation. The system disclosed presently does not rely on electromagnetic radiation and includes the ability to pre-program specific lessons as generated by the laryngeally impaired individual in conjunction with his speech pathologist. Other devices found in the prior art have left the control of prosody to the control of the laryngectomee and required a high level of manual dexterity to provide inflection and naturalness. In practice, very few laryngectomees use this capability because the timing and control is too difficult.

SUMMARY OF THE INVENTION

The disclosed invention provides natural prosody in real time to the speech of laryngeally impaired people (laryngectomees). The invention provides prosody through the means of software running on a digital signal processor and software program running in real time thereby providing more natural speech than is achievable through any manually controlled system.

In addition to providing prosody, the disclosed system has other capabilities providing increased naturalness including: noise cancellation of sound from a neck vibrator excitation source, feedback control to allow use of a microphone distant from the mouth, aspiration noise to mimic real speech, amplification selectively of consonants over vowels to assist in intelligibility, automatic gain control to allow for movement of the head with respect to the microphone, user selection of mood of speech, volume control, whisper speech, telephone mode, training aids, ability to interface with myoelectric signals to provide automatic hands free starting and stopping control as well as user controlled intonation, and the extraction of voice parameters from a user before laryngeal impairment to recreate the voice.

An automatic gain control system has been provided to regulate the output. The unit provides "whisper" speech by using a white noise excitation instead of the glottal pulse excitation. The unit can be used to change the excitation frequency of the sound source in real time. This is useful in use over the telephone or in a stand alone unit which may be used without the loudspeaker. Training aids using pattern recognition are programmed into the device to allow speech pathologists to provide lessons whereby the user gets feedback as to whether his articulation and time is being done according to instruction. The unit is capable of being adapted to receive myoelectric signals for hands free operation. In addition in the case of laryngeally impaired individuals with the larynx nerve replaced to a neck muscle nerve the myoelectric signal can automatically turn the unit on and off and include user directed intonation. Without the myoelectric attachment the user can select from moods of speech which help express himself depending upon situation. Moods such as relaxed, tense, angry, confident can be generated by selecting various components of the prosody algorithm in combination with the glottal pulse parameters. The algorithm disclosed with the present invention provides a means to determine and reproduce a speakers pitch to best reproduce the original voice and inflections of a speaker such as to make the speech more natural. A computer software program listing is included with this disclosure which teaches one means to carry out the pitch determining algorithm which is taught herein.

It is, therefore, the primary objective of the present invention is to provide intelligible and natural sounding speech for individuals with laryngeal impairment while including the feature of prosody as they speak.

Accordingly, it is an object of this invention to recreate natural prosody without the conscious intervention of the user through use of a computer algorithm to process speech. It is also an object of the disclosed invention to provide for prosody and speech improvement by tapping the nerve signal generated in the larynx nerve which controls the larynx in normal speakers to that a signal can be provided for stopping and starting speech. It is also the object of the invention to utilize the same signal to provide information as to the larynx tension, which relates to the pitch of speech, such that the speakers intent can be realized by utilization of the myoelectric signal to process speech.

A second object of the invention is to recreate speech sounding as much like the original voice of the speaker as possible by applying algorithms which duplicate the frequency range, the rise and fall times and other characteristics of the speaker in the original speech and comparing them with the rise and fall times of speech created using an artificial glottal pulse, utilizing a digital signal processor to correct for the difference to create speech similar to the speaker's original voice.

A third objective of the invention is to provide feedback to the user as to how well he/she is doing in learning some of the fundamentals of how to make the speech device sound clearer by using pattern recognition such that useful information in the form of instruction can be provided for the user.

It is also an object of the invention to allow the user to change the mood of his speech through various algorithms which signal calmness, levity, anger, friendship, command etc., by altering setting of the disclosed prosody algorithm.

A further object of the invention is to recreate the natural voice of an individual which existed prior to laryngeal damage or removal.

DETAILED DESCRIPTION OF THE PREFERRED EMBODIMENT

Figure 1:
FIG. 1 is a pictorial view depicting a user wearing an embodiment of the present invention and particularly illustrating a contact microphone and a neck vibrator worn about the neck of a user of the invention.

FIG. 1 depicts some of the major components of the current invention, including an excitation device 2 on the neck together with a contact microphone 4. Generally for devices mounted inside the mouth, a radio frequency signal carries the information about the glottal pulse. For neck mounted vibrators, wires would generally be used to carry the signal. However, a self contained neck vibrator 6 using an rf signal and its own batteries for power could be used. For the case of some tracheo-esophageal puncture speakers, their own voice sound may be used as the primary excitation.

A microphone is worn in front of the mouth, in the mouth, or coupled through tissue or bone to the vocal tract. The neck mounted device and the microphone are connected to a control circuit directly by wires, or through electromagnetic field transmission such as a radio frequency transmission or infrared light coupling system. The unit may also be adapted to directly connect to a telecommunication device rather than be coupled to a audio output device for local voice reproduction. The control unit may be worn on the belt or any other convenient location such as a pocket or other element of clothing. The control unit performs the following functions. The analog electrical signal from the microphone input 10 is converted to a digital signal by an analog to digital converter 12. The digital signal is analyzed within the digital signal processor 14. The digital signal processor 14 converts the basic voice signals into an LPC method. The voice signal is re-synthesized using the LPC method and the generation of a glottal pulse, which has been designed to sound like a normal human glottal pulse. The voice frequency is selected on the basis of an algorithm which determines both the amplitude and rate of change of the amplitude of the voice signal. A calculation is performed using both the amplitude and the rate of change of amplitude to determine what the voice frequency should be to adjust the sound of the voice to be more natural. The control unit may be worn on the belt or any other convenient location such as a pocket or other element of clothing. The control unit performs the following functions. The analog electrical signal from the microphone input 10 is converted to a digital signal by an analog to digital converter 12. The digital signal is analyzed within the digital signal processor 14. The digital signal processor 14 converts the basic voice signals into an LPC method. The voice signal is re-synthesized using the LPC method and the feneration of a glottal pulse, which has been designed to sound like a normal human glottal pulse. The voice frequency is selected on the basis of an algorithm which determines both the amplitude and rate of change of the amplitude of the voice signal. A calculation is performed using both the amplitude and the rate of change of amplitude to determine what the voice frequency should be to adjust the sound of the voice to be more natural.

Figure 2:
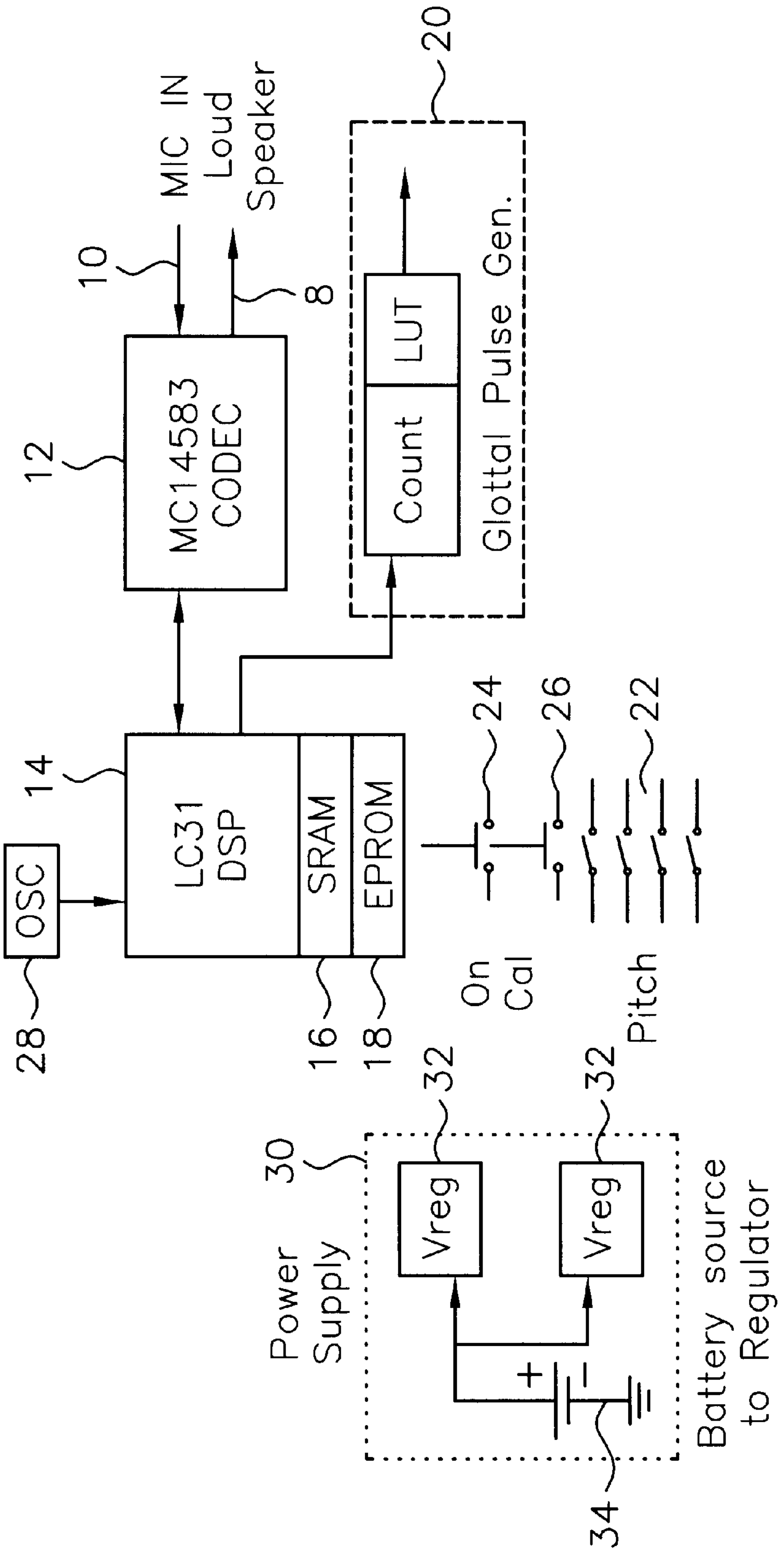
FIG. 2 is a block diagram of the electronic control circuit components used in the invention.

Turning now to FIG. 2, the control circuitry is more particularly described using the main hardware elements, which carry out the method disclosed. The major hardware components include the microphone input 10 and loud speaker output devices 8 which are interfaced through an analog to digital converter 12, such as the Motorola MC145483. Additional power gain is provided to the loud speaker through an amplifier such as could in a device such as chip LM871. The digital signal resulting from the conversion of the speech input is introduced into a digital signal processor (DSP) such as the Texas Instruments TMS320C31, which is a high speed processor 14 which requires little power to operate, therefore making it a good choice for portable operating. This processor 14 is interfaced with erasable, programmable read-only memory 18 containing the program control and with random access memory 16 for performing calculations in real time. A power supply 30 converts and conditions the voltage from rechargeable batteries 34. Signal output from the DSP 14 also goes to either the transmitter circuit which sends a signal to the oral unit to recreate voice or to an amplifier which drives a conventional neck vibrator 6 with a square wave signal. A square wave signal provides the best power efficiency for driving the neck vibrator if such a vibrator is attached. Oscillator 28 determines the clock speed or cycle speed of DSP 14. It can be appreciated by those skilled in the art that the design and operation of DSP 14 can be a varied design and implemented with a variety of different commonly available hardware. The system need only be able to process the speech input from the user by applying the decision making process inherent in the algorithm disclosed below such as to generate reconditioned speech, providing a more natural reproduction of the speakers otherwise impaired voice. Whether such processing is accomplished with a digital signal processor, in an analog domain or in some other fashion, the out put of the system can be accomplished by carrying out the processing technique and algorithm method described in the present invention.

Figure 3:
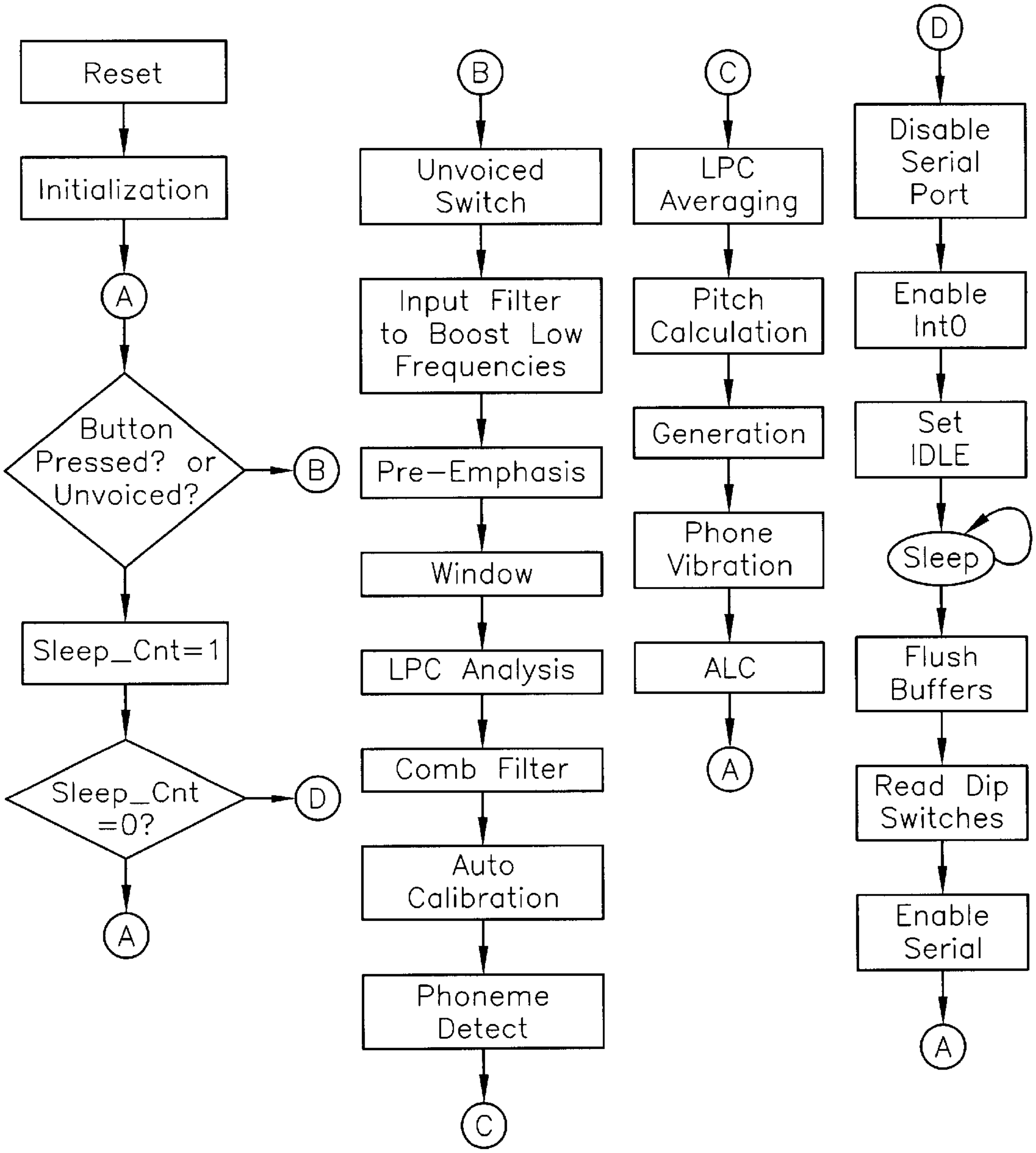
FIG. 3 is a block diagram of the algorithm used in the signal processing illustrating the main processing steps used in processing speech in the invention.

Turning now to FIG. 3, a flow chart diagram describing the main processing and overall logic approach to the operation of the device is disclosed. When the power is applied to the circuit, the processor resets and initializes all parameters. Parameters to be set are, for example, male or female voice, telephone mode, whisper mode and other parameters relating to frequency adjustment. If the activate button is pressed, the processor starts to analyze speech information coming in through the microphone input 10. If the activate button is not depressed, the unit goes into the sleep mode where the parametric information is saved and ready to use, but the processor is drawing very low current.

When the activate button is depressed, the input signal undergoes a gain boost for the lower frequencies. Then the signal is pre-emphasized with another filter. (Preemphasis—The digitized speech signal (proc_array in main program echo.c) is put through first-order system. In this case, the output s1 (n) is related to the input s(n) by the difference equation: S1(n)=s(n)−0.94s(n−1), where n is the framesize. The framesize is 128 samples; the frame overlap is 48 samples. Accordingly, only 80 new samples are required to complete a frame for analysis. With a framesize of 128 samples and a sample rate of eight Kilohertz, the frame time would be 16 milliseconds in absence of the overlap; however, taking the overlap into account, the frame time is only ten milliseconds. (In the example computer program shown in table 1 attached, the term FRAMESIZE is set to be 128 and the term OVERLAP is set to 48.) The signal is windowed using a Hamming window, and then it goes through LPC analysis. The LPC method uses the reflection (or PARCOR) coefficients, RMS (root mean square) of the energy and gain term of the LPC model based on the Durbin's algorithm. This technique is well known and described in the literature. A comb filter is added. In effect the comb filter calculates the minimum energy in the signal. This energy level is typical of silence in the speech, but either the oral stimulator or the neck vibrator may have some residual noise associated with it which is then removed.

An autocalibration algorithm continuously calculates the average RMS energy of the signal to update the variable detection discrimination function. This is important because variation in the input level can effect the decision level of the frequency determining algorithm.

The phone vibration unit takes the calculated pitch of the output signal and modulates the neck vibrator or oral unit output signal to track the dominant pitch of speech. This is useful when a speaker is talking directly into a telephone device.

Automatic gain control is also used on the output to adjust the sound level from the loud speakers. This prevents the output from overloading and keeps a relatively constant output level.

When the activate button is not pressed the unit goes into the sleep mode. This disables the serial port, enables the initialization and sets the processor to idle. When the activate button is depressed again the unit comes out of sleep mode using initialization settings which were present following reset.

Figure 4:
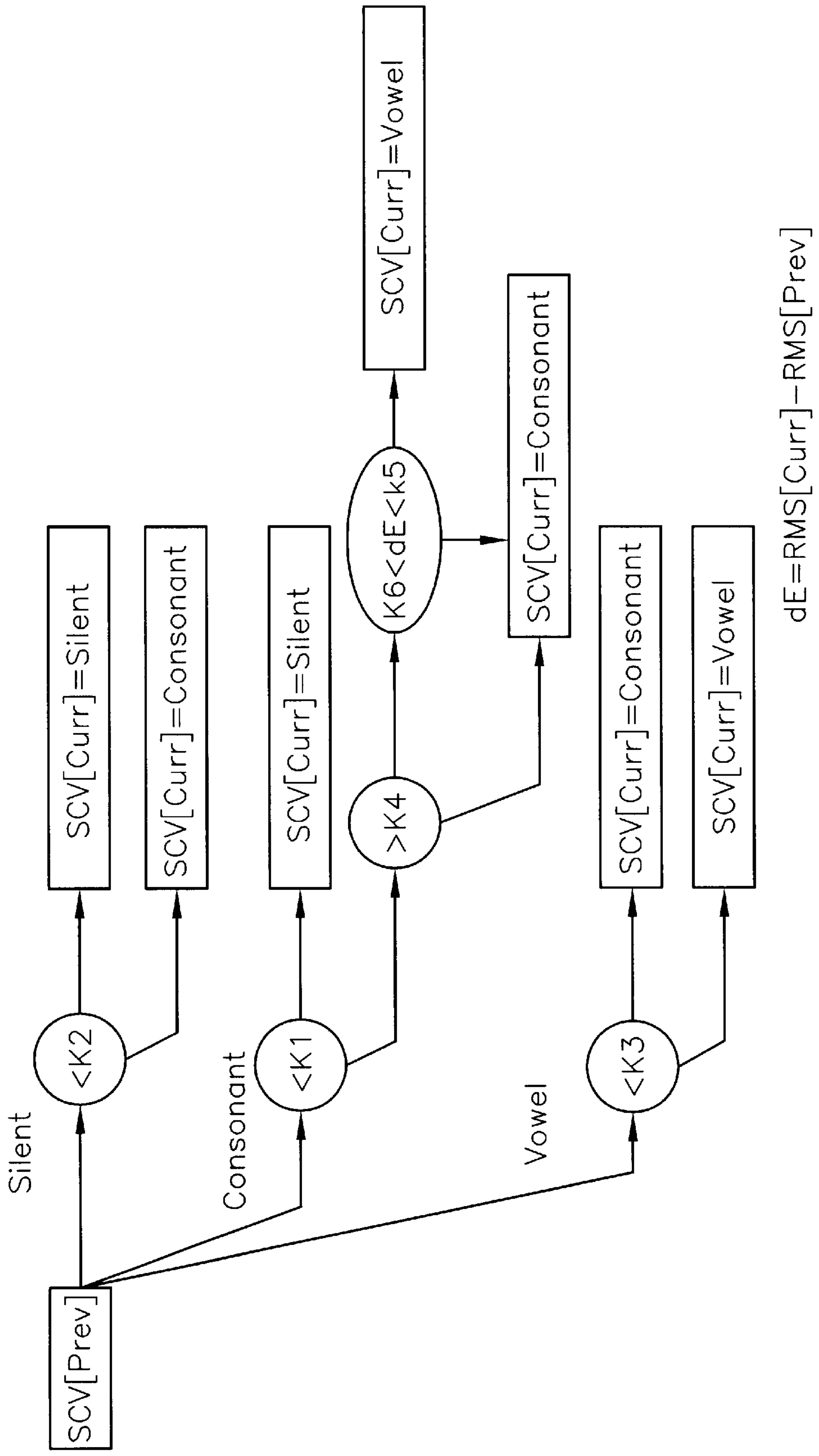
FIG. 4 describes the algorithm used to determine the pitch as described in the present invention.

FIG. 4 discloses the analysis method used in the pitch determining algorithm. The algorithm to determine pitch uses phoneme detection and is based on the relative amplitude of the signal. Depending on the amplitude a phoneme is classified either as a vowel, a consonant or silence. An averaging function is used to prevent "unnatural" gain changes from frame to frame. A pitch generation function estimates the pitch based on the RMS of the current and adjacent frames. A synthesis function provides the synthesis of the output speech using a lattice filter model. In considering FIG. 4, there are certain input voice parameters of interest. T.G. determines the ratio of pitch change with change in power of the signal. Minimum pitch is defined as the lowest frequency of the output. The maximum pitch is defined as the highest frequency of the output. The rate increase is simply the rate at which the pitch increases. Likewise, rate decrease is simply the rate at which the pitch decreases. The consonant noise level is the relative noise level of consonants in the voice signal being processed.

A level is set for the minimum pitch. Another level is set for the maximum pitch. An independent parameter is set for the rate of pitch increase and another is set for the rate of decrease. A third parameter determines the overall ratio of pitch change with change in power.

Certain decision levels trigger various pitch increase and decreases rules. The decision levels which are important include:

K1—determines the threshold (relative power level) to change from a consonant to vowel.

K2—determines the threshold that must be reached to change from silence to consonant.

K3—determines the threshold to change from vowel to consonant.

K4—determines the threshold to change from consonant to vowel.

K5—a consonant decision will remain a consonant unless the K4 threshold is reached and the change in energy is less than the K5 threshold.

K6—a consonant decision will remain a consonant unless the K4 threshold is reached and the change in energy is greater than the K6 threshold.

The signal power level is compared with K1, K2 or K3. If it is less than K2, it is classified as silence and no LPC speech construction occurs. If it is greater than K2 it is tested as a consonant. There is no direct path from silence to vowel. Once the signal has been classified as a consonant it is tested against new parameters. If the level is greater than K1 it is classified as a vowel. If it is less than K1 it is tested against K4. If it is greater than K4 it is classified as a vowel. If it is less than K4 it remains a consonant. The decision will maintain consonant status unless the K4 threshold is reached and the change in energy is less than the K5 threshold. If the K4 threshold is reached and the change in energy is greater than the K6 threshold, a vowel decision is made. The reason for these various levels is to generate a hysteresis so that the signal level does not rapidly swing from consonant to vowel or silence with minor fluctuations in signal power.

The selection of the threshold values is determined by the desired reproduction of the sound of the voice being processed. It is useful to record and analyze the natural sound of an intended user of the invention, if the opportunity is present, prior to any surgical procedure which may alter the voice. In such a fashion, the constants desirable to dial into the processing for switching or selection may be more readily determined rather that empirically adjusting the values of K to match the desired end effect. However, In accordance with the invention which is disclosed, a computer listing to carry out the invention and which allows one to practice the method so described in the following table which comprises the computer code listing carries out the invention as illustrated in this disclosure. Table 1 attached provides a computer code listing which one skilled in the art may use to carry out the invention utilizing digital processing means.

From the foregoing description it will be readily apparent that a speaking device for laryngectomees has been developed which allows for a more natural and more understandable speech. The naturalness is provided primarily by the inclusion of prosody. Other effects including consonant amplification, the inclusion of aspiration noise, variation of the glottal pulse with the frequency are included. The improved understandability is due to the relative amplification of consonants, by the injection of aspiration sounds, and also by the injection of white noise to accentuate fricative sounds. The entire device is conveniently packaged to be worn or carried easily and is battery powered. The method also taught with the present disclosure provides a method of processing speech in real time to provide a more natural sounding output from an altered or impaired voice input.

Although the invention has been described in terms of the preferred embodiment and with particular examples that are used to illustrate carrying out the principals of the invention, it would be appreciated by those skilled in the art that other variations or adaptations of the principal disclosed herein, could be adopted using the same ideas taught herewith. Such applications and principals are considered to be within the scope and spirit of the invention disclosed and is otherwise described in the appended claims. Such adaptations further include use of analog processing to select and analyze the input speech to be precessed. The method of impaired speech correction may be carried out by other electronic means, whether digital or analog, which provide the same type of signal processing to accomplish the speech conversion taught herein in real time or in a delayed environment. Such uses could include adaptation of speech to text conversion for laryngeally impaired individuals, or similar applications in telecommunications devices.

What is claimed:

1. A method of creating or reproducing prosody in speech using a Linear Predictive Coding algorithm, comprising the steps of:

dividing speech to be processed into components of silent, consonant and vowel;

processing said silent component to determine a threshold level to alter said component to consonant sound or to maintain silent sound;

wherein further said consonant component is selected from a threshold value to determine whether said consonant component exceeds a threshold to be modified to a vowel, or selected for additional threshold measurement to change said consonant component from a consonant to a vowel;

wherein further said vowel component is measured against a threshold level set to determine whether said vowel component is changed from a vowel to a consonant.

2. A means for creating or reproducing prosody in speech comprising:

an analog to digital converting means to convert analog human speech to a digital equivalent;

a digital signal processor to process said digital equivalent signal;

an electronic memory means to store an instruction set to operate said digital signal processing means;

means to process said digital signal processor output to convert said output to a reconditioned analog voice signal; and an instruction set stored in said electronic memory means to control said processing by said digital signal processor to alter the reconditioned analog voice signal in accordance with the intended sound of the speech being processed;

wherein further said digital signal processing means selects the input to said digital signal processing means to alternate and select between silent, consonant and vowel components of the-inputted human speech being processed;

wherein further, the silence component is capable of being further divided into silence or a consonant sound;

wherein the consonant component is capable of being further divided into silence or, upon reaching another pre-set threshold level, into a vowel sounds or a consonant sound;

wherein the vowel component is processed to be further divided into a consonant sounds or a vowel sound.

* * * * *